United States Patent [19]
Stahovic et al.

[11] Patent Number: 5,990,234
[45] Date of Patent: Nov. 23, 1999

[54] COATING COMPOSITION

[75] Inventors: Robert Stahovic, Cambridge Springs, Pa.; Anthony J. Pecora, Tucson, Ariz.

[73] Assignee: BTG, a Partnership

[21] Appl. No.: 09/126,215

[22] Filed: Jul. 30, 1998

[51] Int. Cl.$^6$ ............... C08J 3/00; C08K 3/20; C08L 75/00; B32B 9/04; B32B 27/00

[52] U.S. Cl. .......... 524/839; 523/149; 523/150; 524/9; 524/13; 524/366; 524/376; 524/442; 524/448; 524/591; 524/840; 428/411.1; 428/423.1

[58] Field of Search ................. 523/149, 150; 524/376, 366, 591, 839, 840, 9, 13, 448, 442; 428/423.1, 411.1

[56] References Cited

U.S. PATENT DOCUMENTS

| | | | |
|---|---|---|---|
| 4,059,551 | 11/1977 | Weiant et al. | 260/29.6 H |
| 5,066,705 | 11/1991 | Wickert | 524/457 |
| 5,548,019 | 8/1996 | Kawakami et al. | 524/591 |
| 5,658,376 | 8/1997 | Noguchi et al. | 106/31.43 |
| 5,753,215 | 5/1998 | Mougin | 424/70.11 |

*Primary Examiner*—Patrick D. Niland
*Attorney, Agent, or Firm*—Lovercheck and Lovercheck

[57] ABSTRACT

The invention provides a liquid composition for coating surfaces, comprising: polymer droplets dispersed in a liquid component, ultraviolet light (UV) absorber, and defoamer. The liquid component comprises water, and volatile organic solvent. The organic solvent comprises a first and a second ether. The first and the second ether are miscible with water. The UV absorber and the defoamer are dispersed in the liquid component. A preferred embodiment of the invention provides the liquid composition with a particulate composition to provide a material for superior non-skid surface coatings, such as non-skid flooring surface coatings. Thus, the invention provides a material for making non-skid coatings, comprising: a particulate composition including wollastonite particles, cellulose particles, and diatomaceous earth particles. The invention provides a method of forming a non-skid coated substrate, comprising: providing a material for making non-skid coatings, comprising: particulate composition, the particulate composition comprising wollastonite particles, cellulose particles, and diatomaceous earth particles, providing liquid composition comprises water, fungicide, defoamer, ultra-violet light absorber and polymeric material, mixing the particulate composition and the liquid composition to form a coating composition, coating the coating composition onto a surface of a substrate to form a non-skid coated substrate.

20 Claims, No Drawings

2

COATING COMPOSITION

BACKGROUND OF THE INVENTION

The invention relates to coating compositions. The invention provides compositions and methods for providing coating compositions for coating wood, metal, glass, stone, concrete, masonry adobe and ceramic surfaces. Such coatings improve the aesthetic appearance of the surface coated, reduce the risk of injury from slipping and falling, on such surfaces particularly when they are wet.

The invention to provides a liquid composition for coating surfaces, comprising: polymer droplets dispersed in a liquid component, ultraviolet light (UV) absorber, and defoamer. The liquid component comprises water, and volatile organic solvent. The organic solvent comprises a first and a second ether. The first and the second ether are miscible with water. The UV absorber and the defoamer are dispersed in the liquid component.

It is an object of the invention to provide a liquid composition for coating surfaces, comprising: polymer droplets dispersed in a liquid component, ultraviolet light (UV) absorber, and defoamer.

It is an object of the invention to provide a material for making non-skid coatings, comprising a particulate composition including wollastonite particles, cellulose particles, and diatomaceous earth particles.

It is an object of the invention to provide a method of forming a non-skid coated substrate, comprising: providing a material for making non-skid coatings, comprising: particulate composition, the particulate composition comprising wollastonite particles, cellulose particles, and diatomaceous earth particles, providing liquid composition comprises water, fungicide, defoamer, ultra-violet light absorber and polymeric material, mixing the particulate composition and the liquid composition to form a coating composition, coating the coating composition onto a surface of a substrate to form a non-skid coated substrate.

Diatomaceous earth as used herein refers to diatomite material, which is composed of the skeletons of small prehistoric aquatic plants related to algae (diatoms). Diatomaceous earth has the chemical name, silicon dioxide (silica) and chemical formula: SiO2.

Diatomaceous earth particles as used herein preferably refers to particles of diatomaceous earth, preferably having a particle size less than 10 mesh and greater than 100 mesh.

Wollastonite as used herein refers to material having the chemical formula CaSiO3 particularly as naturally occuring in metamorphic rocks.

Wollastonite particles as used herein preferably refers to particles of wollastonite having a particle size less than 10 mesh and greater than 100 mesh.

Cellulosic as used herein refers to cellulose and materials derived from cellulose, such as hydrated cellulose.

Cellulosic particles as used herein preferably refers to particles of cellulosic material. Cellulosic particles preferably are in the form of fibers having an average fiber length between 600 and 300 micrometers and are at least 80 percent retained by a 400 mesh screen.

Non-skid coating as used herein refers to a coating which provides slip resistance because of peaks in the coating surface. Each peak forms over one or more particles.

BRIEF DESCRIPTION OF THE INVENTION

The invention provides a liquid composition for coating surfaces, comprising: polymer droplets dispersed in a liquid component, ultraviolet light (UV) absorber, and defoamer. The liquid component comprises water, and volatile organic solvent. The organic solvent comprises a first and a second ether. The first and the second ether are miscible with water. The UV absorber and the defoamer are dispersed in the liquid component.

A preferred embodiment of the invention provides the liquid composition with a material for making non-skid coatings, comprising: a particulate composition including wollastonite particles, cellulose particles, and diatomaceous earth particles. Preferably the cellulose particles comprise fibers. Preferably the material further comprising a liquid composition, and the liquid composition is mixed with the particulate composition. Preferably the liquid composition comprises water and polymeric material. Preferably the liquid composition comprises water, fungicide, defoamer, ultra-violet light absorber and polymeric material. Preferably the wollastonite particles have a particle size less than 10 mesh. Preferably the at least 50 percent by weight of the wollastonite particles have a particle size greater than 100 mesh. Preferably the particulate composition comprises from 2 to 70 percent by weight of wollastonite particles, from 0.1 to 25 percent by weight of cellulose particles, and from 30 to 95 percent by weight of diatomaceous earth particles. More preferably the particulate composition comprises from 5 to 30 percent by weight of wollastonite particles, from 0.5 to 10 percent by weight of cellulose particles, and from 40 to 90 percent by weight of diatomaceous earth particles. Preferably the material is coated onto a surface comprising wood, metal, glass, stone, concrete, masonry, adobe or ceramic. Preferably the liquid composition further comprises a polymerizable compound. Preferably the liquid composition further comprises a paint or varnish.

The invention provides a method of forming a non-skid coated substrate, comprising: providing a material for making non-skid coatings, comprising: particulate composition, the particulate composition comprising wollastonite particles, cellulose particles, and diatomaceous earth particles, providing liquid composition comprises water, fungicide, defoamer, ultra-violet light absorber and polymeric material, mixing the particulate composition and the liquid composition to form a coating composition, and coating the coating composition onto a surface of a substrate to form a non-skid coated substrate. Preferably the substrate surface comprises wood, metal, glass, stone, concrete, masonry, adobe or ceramic.

DETAILED DESCRIPTION OF THE INVENTION

The invention provides a liquid composition for coating surfaces, comprising: polymer droplets dispersed in a liquid component, ultraviolet light (UV) absorber, and defoamer. The liquid component comprises water, and volatile organic solvent. The organic solvent comprises a first and a second ether. The first and the second ether are miscible with water. The UV absorber and the defoamer are dispersed in the liquid component.

A preferred embodiment of the invention provides the liquid composition with a particulate composition to provide a material for superior non-skid surface coatings, such as non-skid flooring surface coatings. Thus, the invention provides a material for making non-skid coatings, including a particulate composition including wollastonite particles, cellulose particles, and diatomaceous earth particles. While not wanting to be bound by any particular theory of the operation and/or interaction it is believed that the particles in use in accordance with the invention include diatomaceous earth particles adhering to the wollastonite particles and to the cellulose particles forming clusters of particles, and these clusters form a colloidal suspension on the liquid composition. In use as non-skid flooring surfaces being walked on by pedestrians and/or driven on by motor vehicles, such as automobiles and trucks, the diatomaceous earth particles are worn from material of the invention long before the wollastonite particles. Thus, for example, a wood, metal, glass, stone, concrete, masonry, adobe or ceramic substrate surface is stepped on and/or stood on daily by at least 100 pedestrians having weights ranging from 50 to 300 pound for six months and a greater portion of the diatomaceous earth particles than wollastonite particles are worn from the material. The surface coated with material in accordance with the invention retains non-skid and/or slip resistance for at least six months, and more preferably for at least one year.

Preferably the cellulose particles comprise fibers. Preferably the material further comprising a liquid composition, and the liquid composition is mixed with the particulate composition. Preferably the liquid composition comprises water and polymeric material. Preferably the liquid composition comprises water, fungicide, defoamer, ultra-violet light absorber and polymeric material. Preferably the wollastonite particles have a particle size less than 10 mesh. Preferably at least 50 percent by weight of the wollastonite particles have a particle size greater than 100 mesh. Preferably the particulate composition comprises from 2 to 70 percent by weight of wollastonite particles, from 0.1 to 25 percent by weight of cellulose particles, and from 30 to 95 percent by weight of diatomaceous earth particles. More preferably the particulate composition comprises from 5 to 30 percent by weight of wollastonite particles, from 0.5 to 10 percent by weight of cellulose particles, and from 40 to 90 percent by weight of diatomaceous earth particles. Preferably the material is coated onto a surface comprising wood, metal, glass, stone, concrete, masonry, adobe or ceramic. Preferably the liquid composition further comprises a polymerizable compound. Preferably the liquid composition further comprises a paint or varnish.

The invention provides a method of forming a non-skid coated substrate, comprising: providing a material for making non-skid coatings, comprising: particulate composition, the particulate composition comprising wollastonite particles, cellulose particles, and diatomaceous earth particles, providing liquid composition comprises water, fungicide, defoamer, ultra-violet light absorber and polymeric material, mixing the particulate composition and the liquid composition to form a coating composition, coating the coating composition onto a surface of a substrate to form a non-skid coated substrate. Preferably the substrate surface comprises wood, metal, glass, stone, concrete, masonry, adobe or ceramic.

EXAMPLE 1

A particulate composition for making non-skid coatings is formed by mixing 116.2 grams of wollastonite particles, 23.8 grams of cellulose particles, and 462.8 grams of diatomaceous earth particles for 30 minutes to form a particulate composition having a substantially uniformly distributed particulate mixture.

EXAMPLE 2

A liquid composition for making non-skid coatings is formed by adding to a mix tank 5.5 grams of 2[(hydroxymethyl)amino]ethanol (a fungicide) to 803.9 grams of water. Then adding 2837.2 grams of urethane polymer (FLEXTHANE 620 sold by Air Products) and mixing for 15 minutes.

In a separate container forming a premix by adding while stirring 142.3 grams of tripropylene glycol monomethyl ether also known as propanol,(2(2-methoxymethyethoxy) Methylethoxy), (ARCOSOLV TPM sold by ARCO Chemical Company), 142.3 grams of propoxy propoxy butanol also known as dipropylene glycol butoxy ether, (ARCOSOLV DPNB sold by ARCO Chemical Company), 27.6 grams of Poly (oxy-1,2-ethanediyl),.alpha.-[3-[3-(2H-benzotriazol-2-yl)-5-(1,1-dimethylethylethyl)-4-hydroxyphenyl]-1-oxopropyl]-.omega.-[3-[3-(2H-benzotriazol-2-yl)-5-(1,1-dimethylethyl)-4-hydroxyphenyl]-1-oxopropoxy[-; Poly (oxy-1,2-ethanediyl),.alpha.-[3-[3-(2H-benzotriazol-2-yl)-5-(1,1-dimethylethylethyl)-4-hydroxyphenyl]-1-oxopropyl]-.omega.-hydroxy-; Polyethylene glycol (TINUVIN 1130, UV absorber, SOLD BY CIBA-GEIGY CORPORATION), 14.2 grams of bis(l,2,2,6,6-pentamethyl-4-piperidinyl) sebacate; Methyl(1,2,2,6,6-pentamethyl-4-piperidinyl) sebacate (TINUVIN 292, a light stabilizer, SOLD BY CIBA-GEIGY CORPORATION), 22.9 grams of defoamer (BYK-346, a mixture of hydrophobic solids, emulsifiers and foam destroying polysiloxanes in polyglycol, sold by BYK-Chemie USA), and 2.7 grams of defoamer (BYK-022, a mixture of hydrophobic solids, emulsifiers and foam destroying polysiloxanes in polyglycol, sold by BYK-Chemie USA).

The premix is then added to the mix tank and mixing is continued for an additional 50 minutes at 212° F. (100° C.). Then 11.8 grams of 3-Iodo-2-propynyl butyl carbamate (Troysan polyphase P-20T, a fungicide, sold by TROY corporation) is added to the mix tank and mixing is continued for an additional 20 minutes at 212° F. (100° C.) to form a liquid composition for making non-skid coatings.

EXAMPLE 3

The particulate composition formed in Example 1 is added to the liquid composition formed in Example 2 in the mix tank and mixing is continued for an additional 30 minutes at 212° F. (100° C.) to form a material for making non-skid coatings.

EXAMPLE 4

The material for making non-skid coatings formed as described in Example 3 is brushed onto a wood surface and hardens to form a non-skid coating on the wood.

EXAMPLE 5

The material for making non-skid coatings formed as described in Example 3 is brushed onto a metal surface and hardens to form a non-skid coating on the metal.

EXAMPLE 6

The material for making non-skid coatings formed in Example 3 is brushed onto a glass surface and hardens to form a non-skid coating on the glass.

EXAMPLE 7

The material for making non-skid coatings formed as described in Example 3 is mixed with an equal mass of latex paint and brushed onto a ceramic surface and hardens to form a non-skid coating on the ceramic.

EXAMPLE 8

The material for making non-skid coatings formed as described in Example 3 is mixed with an equal mass of varnish and brushed onto a wood surface and hardens to form a non-skid coating on the wood.

In accordance with a preferred embodiment of the invention is provided a composition for coating surfaces, including polymer droplets dispersed in a volatile liquid component, ultraviolet light (UV) absorber, and defoamer. The volatile liquid component including water, and volatile organic solvent. The organic solvent including a first and a second ether. The first and the second ether are miscible with water. The UV absorber and the defoamer are dispersed in the volatile liquid component. Preferably the first ether is tripropylene glycol monomethyl ether and the second ether is dipropylene glycol butoxy ether. Preferably the composition further includes a fungicide. Preferably the polymer is a urethane polymer. Preferably the composition further includes pigment. Preferably the composition further includes polymerizable compound. Preferably the composition is a varnish or a latex paint. Preferably the composition further includes a particulate material, including wollastonite particles, cellulosic particles, and diatomaceous earth particles. Preferably the cellulosic particles include cellulose fibers. Preferably the liquid includes 2 [(hydroxymethyl) amino]ethanol, Poly (oxy-1,2-ethanediyl),.alpha.-[3-[3-(2H-benzotriazol-2-yl)-5-(1,1-dimethylethyltbutyl)-4-hydroxyphenyl]-1-oxopropyl]-.omega.-[3-[3-(2H-benzotriazol-2-yl)-5-(1,1-dimethylethyl)-4-hydroxyphenyl]-1-oxopropoxy]-; Poly (oxy-1,2-ethanediyl),.alpha.-[3-[3-(2H-benzotriazol-2-yl)-5-(1,1-dimethylethyl)-4-hydroxyphenyl]-1-oxopropyl]-.omega.-hydroxy-; Polyethylene glycol, and
bis(1,2,2,6,6-pentamethyl-4-piperidinyl)sebacate; methyl (1,2,2,6,6-pentamethyl-4-piperidinyl)sebacate. Preferably the first ether is tripropylene glycol monomethyl ether, and the second ether is propoxy propoxy butanol.

In accordance with a preferred embodiment of the invention is provided a material for making non-skid coatings, including polymer droplets dispersed in a volatile liquid component and a particulate component including wollastonite particles, cellulosic particles, and diatomaceous earth particles. Preferably the cellulosic particles include cellulose fibers. Preferably the liquid component includes water and a first and a second ether, and the first and the second ether are miscible with water. Preferably the liquid component includes fungicide, defoamer, an ultra-violet light absorber and, the UV absorber and the defoamer are dispersed in the volatile liquid component. Preferably at least 50 percent by weight of the wollastonite particles have a particle size greater than 100 mesh. Preferably the particulate composition includes from 2 to 70 percent by weight of wollastonite particles, from 0.1 to 25 percent by weight of cellulose particles, and from 30 to 95 percent by weight of diatomaceous earth particles.

It should be understood that while the present invention has been described in considerable detail with respect to certain specific embodiments thereof, it should not be considered limited to such embodiments but may be used in other ways without departure from the spirit of the invention and the scope of the appended claims.

What is claimed is:

1. A composition for coating surfaces, comprising:
polymer droplets dispersed in a volatile liquid component, and a particulate composition, said particulate composition comprising from 2 to 70 percent by weight of wollastonite particles, from 0.1 to 25 percent by weight of cellulose particles, and from 30 to 95 percent by weight of diatomaceous earth particles,
said volatile liquid component comprising water, and volatile organic solvent.

2. The composition of claim 1 further comprising ultraviolet light (UV) absorber, and defoamer, and wherein said organic solvent comprises a first and a second ether, said first and said second ether being miscible with said water, said UV absorber and said defoamer being dispersed in said volatile liquid component.

3. The composition of claim 1 wherein said cellulosic particles comprise cellulose fibers.

4. The composition of claim 1 wherein said particulate composition consist essentially of wollastonite particles, cellulose particles, and diatomaceous earth particles.

5. The composition of claim 2 wherein said first ether is tripropylene glycol monomethyl ether and said second ether is dipropylene glycol butoxy ether.

6. The composition of claim 1 further comprising a fungicide.

7. The composition of claim 1 wherein said polymer is urethane polymer.

8. The composition of claim 1 further comprising pigment.

9. The composition of claim 1 further comprising a polymerizable compound.

10. The composition of claim 1 wherein said composition is a varnish or a latex paint.

11. The composition of claim 1 wherein said liquid comprises 2[(hydroxymethyl)amino]ethanol, Poly (oxy-1,2-ethanediyl),.alpha.-[3-[3-(2H-benzotriazol-2-yl)-5-(1,1-dimethylethyltbutyl)-4-hydroxyphenyl]-1-oxopropyl]-.omega. -[3-[3-(2H-benzotriazol-2-yl)-5-(1,1-dimethylethyl)-4-hydroxyphenyl]-1-oxopropoxy]-;Poly(oxy-1,2-ethanediyl),.alpha. -[3-[3-(2H-benzotriazol-2-yl)-5-(1,1-dimethylethyl)-4-hydroxyphenyl]-1-oxopropyl] .-omega.- hydroxy-; Polyethylene glycol, and
bis(1,2,2,6,6-pentamethyl-4-piperidinyl)sebacate; methyl (1,2,2,6,6-pentamethyl-4 -piperidinyl) sebacate.

12. A material for making non-skid coatings, comprising:
polymer droplets dispersed in a volatile liquid component and a particulate component comprising a colloidial suspension of clusters of particles comprising wollastonite particles,
cellulosic particles, and
diatomaceous earth particles.

13. The material of claim 12 wherein said cellulosic particles comprise cellulose fibers.

14. The material of claim 12 wherein said liquid component comprises fungicide, defoamer, an ultra-violet light absorber and, said UV absorber and said defoamer are dispersed in said volatile liquid component.

15. The material of claim 12 wherein at least 50 percent by weight of said wollastonite particles have a particle size greater than 100 mesh.

16. The material of claim 12 wherein said particulate composition comprises from 2 to 70 percent by weight of wollastonite particles,
from 0.1 to 25 percent by weight of cellulose particles, and
from 30 to 95 percent by weight of diatomaceous earth particles.

17. A non-skid coated substrate material formed from material for making non-skid coatings, comprising:

polymer droplets dispersed in a volatile liquid component and a particulate component comprising a colloidial suspension of clusters of particles comprising wollastonite particles, cellulosic particles, and diatomaceous earth particles.

18. The material of claim 17 wherein said particulate composition comprises from 2 to 70 percent by weight of wollastonite particles, from 0.1 to 25 percent by weight of cellulose particles, and from 30 to 95 percent by weight of diatomaceous earth particles.

19. The material of claim 17 wherein said substrate surface comprises wood, metal, glass or ceramic.

20. The material of claim 17 wherein a greater portion of saic diatomaceous earth particles than wollastonite particles are worn from said material by said surface being stepped on daily by pedestrians having weights ranging from 50 to 300 pound for six months.

* * * * *